(12) United States Patent
Fimoff et al.

(10) Patent No.: US 8,428,188 B2
(45) Date of Patent: Apr. 23, 2013

(54) CARRIER PHASE OFFSET CORRECTION FOR A QAM SYSTEM

(75) Inventors: Mark Fimoff, Hoffman Estates, IL (US); Jinghua Jin, Palatine, IL (US); Greg Tomezak, Buffalo Grove, IL (US)

(73) Assignee: Techwell, Inc., San Jose, CA (US)

( * ) Notice: Subject to any disclaimer, the term of this patent is extended or adjusted under 35 U.S.C. 154(b) by 597 days.

(21) Appl. No.: 12/698,071

(22) Filed: Feb. 1, 2010

(65) Prior Publication Data

US 2010/0322297 A1 Dec. 23, 2010

Related U.S. Application Data

(60) Provisional application No. 61/187,986, filed on Jun. 17, 2009, provisional application No. 61/187,970, filed on Jun. 17, 2009, provisional application No. 61/187,977, filed on Jun. 17, 2009, provisional application No. 61/187,980, filed on Jun. 17, 2009, provisional application No. 61/187,996, filed on Jun. 17, 2009.

(51) Int. Cl.
*H04L 27/38* (2006.01)

(52) U.S. Cl.
USPC ........... 375/316; 375/222; 375/261; 375/343; 375/371

(58) Field of Classification Search ............ 375/316, 375/320, 322, 329, 340, 343, 346, 222, 261, 375/371
See application file for complete search history.

(56) References Cited

U.S. PATENT DOCUMENTS

| | | | |
|---|---|---|---|
| 5,016,206 A * | 5/1991 | Shinonaga | 708/212 |
| 5,025,455 A * | 6/1991 | Nguyen | 375/327 |
| 5,559,808 A | 9/1996 | Kostreski et al. | |
| 5,740,203 A * | 4/1998 | Ramaswamy et al. | 375/341 |
| 5,995,569 A * | 11/1999 | Shimoi et al. | 375/354 |
| 6,882,634 B2 | 4/2005 | Bagchi et al. | |
| 6,961,393 B1 * | 11/2005 | Cupo et al. | 375/343 |
| 7,003,030 B2 | 2/2006 | Abdelilah et al. | |
| 7,089,577 B1 | 8/2006 | Rakib et al. | |
| 7,248,841 B2 | 7/2007 | Agee et al. | |
| 2005/0163094 A1* | 7/2005 | Okada et al. | 370/343 |
| 2008/0304589 A1* | 12/2008 | Tsuruta et al. | 375/260 |

OTHER PUBLICATIONS

PCT International Search Report for PCT/US2010/022772 dated Jun. 7, 2010.

* cited by examiner

*Primary Examiner* — Shuwang Liu
*Assistant Examiner* — David Huang
(74) *Attorney, Agent, or Firm* — Anthony G. Smyth; Loza & Loza, LLP

(57) ABSTRACT

Systems and methods are described that may be used to detect and correct carrier phase offset in a signal. A phase offset corrector receives an equalized signal representative of a quadrature amplitude modulated signal and derives a phase-corrected signal from the equalized signal. The equalized signal is sliced to obtain real and imaginary sequences and a frame synchronizer performs a correlation of the real and imaginary sequences with corresponding parts of a stored frame-sync pseudo-random sequence. Phase correction is based on the maximum real and imaginary values of the correlation. The signal is typically quadrature amplitude modulated signal is modulated using punctured trellis codes. Quadrature phase shift keying modulation, 16-QAM, 64-QAM and other QAM schemes may be used.

15 Claims, 17 Drawing Sheets

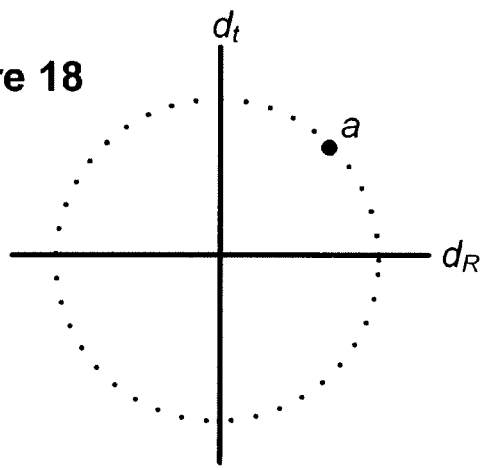
Figure 18
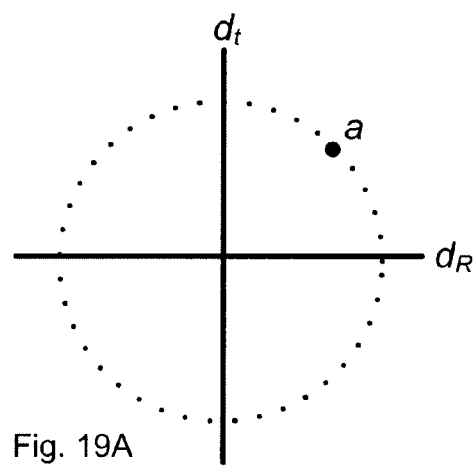
Fig. 19A
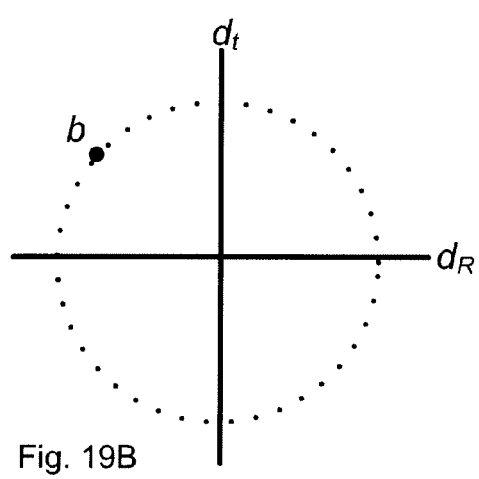
Fig. 19B
Figure 19
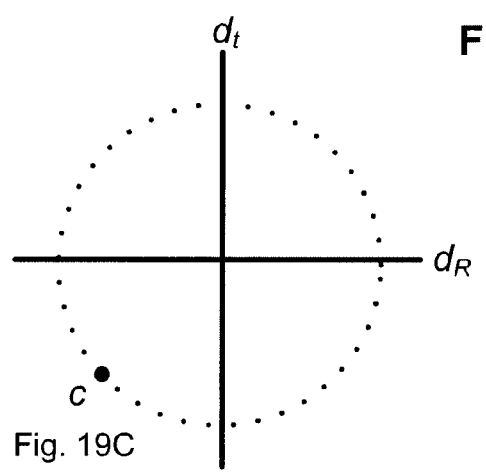
Fig. 19C
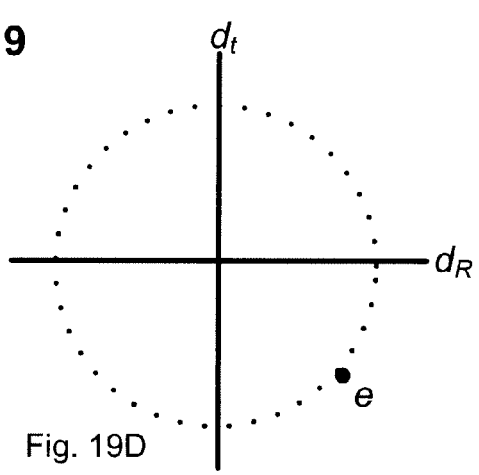
Fig. 19D

CARRIER PHASE OFFSET CORRECTION FOR A QAM SYSTEM

CROSS-REFERENCE TO RELATED APPLICATIONS

The present Application claims priority from U.S. Provisional Patent Application No. 61/187,970 filed Jun. 17, 2009, entitled "SLOC Analog Equalizer For Baseband Video Signal," and from U.S. Provisional Patent Application No. 61/187,977 filed Jun. 17, 2009, entitled "A Method For Constellation Detection In A Multi-Mode QAM Communications System," and from U.S. Provisional Patent Application No. 61/187,980 filed Jun. 17, 2009, entitled "Novel Carrier Phase Offset Correction For A QAM System," and from U.S. Provisional Patent Application No. 61/187,986 filed Jun. 17, 2009, entitled "Novel Frame Structure For A QAM System," and from U.S. Provisional Patent Application No. 61/187,996 filed Jun. 17, 2009, entitled "SLOC SPOT Monitoring," which applications are hereby expressly incorporated by reference herein.

The present Application is related to U.S. patent application Ser. No. 12/363,669, filed Jan. 30, 2009, entitled "Mixed Format Media Transmission Systems and Methods," which is incorporated herein by reference.

BACKGROUND OF THE INVENTION

1. Field of the Invention

The present invention relates generally to digital communications systems and more particularly to phase offset correction in digital communications systems.

2. Description of Related Art

Framing in Digital Communications Systems

Almost all digital data streams have some sort of frame structure such that the data is organized into uniformly sized groups of bits or bytes. Any system that uses block based forward error correction (FEC) will have frames organized around the error correction code word size. Also, if the system uses interleaving to combat impulse noise, the frame structure will be arranged with the interleaver parameters in mind. If the system uses data randomization to achieve a flat spectrum, the pseudo-random sequence utilized may be synchronized to the frame structure, restarting at the beginning of each frame.

For an RF digital communications system, a receiver must typically first achieve carrier and symbol clock synchronization and equalization. It can then recover the transmitted data. But, to make sense of this incoming data stream, the receiver must also synchronize to the frame structure. In other words, the receiver must know where the error correction code words start and end. It also must be able to synchronize receiver modules such as the deinterleaver to match the interleaver operation of the transmitter so that the resultant deinterleaved bits or bytes are correctly ordered, and the de-randomizer to match the starting point of the pseudo-random sequence used in the transmitter to flatten the spectrum.

Conventional systems often provide for receiver frame synchronization by appending a known pattern of symbols of a fixed length at the beginning or end of the frame. This same pattern repeats every frame, and it often consists of a 2 level (i.e. binary) pseudo-random sequence with favorable auto-correlation properties. This means that while the auto-correlation of the sequence with itself at zero offset yields a large value, if the offset is non-zero the correlation value (side-lobe) is very small. Also the correlation for this frame sync sequence with random symbols will yield a small value. Therefore, if the receiver executes a correlation of the incoming symbols with a stored version of the frame sync pattern, it should expect to yield a large value only at the exact start of each frame. The receiver can then easily determine the starting point of each frame.

There can be several modes of operation for the communication system. The modes can include a variety of combinations of symbol constellations, trellis codes, and interleave patterns. The receiver must have knowledge of the mode in order to successfully recover the transmitted data. This can be achieved by adding additional mode symbols to the frame sync pattern. These mode symbols can be reliably received by using correlation methods since they are sent repeatedly every frame. They can be made even more robust by encoding them using a block code.

Examples of Frame Structure in Existing Systems

With reference to FIG. 1, the ATSC digital television (DTV) terrestrial transmission standard adopted in 1996 provides a system in which data is transmitted in frames. Each frame 10 is composed of 313 segments, and each segment contains 832 symbols for a total of 260,416 symbols per frame. The first four symbols in each segment are segment sync symbols 12 comprising the sequence [+5, −5, −5, +5]. The first segment in each frame is a frame sync segment 14 with 312 data segments 16, 18. Referring now to FIG. 2, frame sync segment 14 has a segment sync 200, a 511 symbol pseudo-random noise (PN511) sequence 202, a 63 symbol pseudo-random noise (PN63) sequence 204, a second PN63 sequence 206 and a third PN63 sequence 208. This is followed by 24 mode symbols 210 indicating that the mode is 8 VSB. Pre-code symbols 214 and reserved symbols 212 complete frame sync segment 14.

The segment sync 200 and PN511 202 symbols are a priori known to the receiver and may be used to acquire frame synchronization via correlation methods. All of the aforementioned symbols come from the set {+5, −5}. The last 12 symbols of this segment are from the set {−7 −5 −3 −1 +1 +3 +5 +7}, and are duplicates of the last 12 symbols of the preceding data field. These are called the precode symbols (not discussed here).

Referring also to FIG. 3, for each of the subsequent 312 segments of the field, referred to as data segments, the 828 symbols 32 following the four segment sync symbols 30 are created from a single 207 byte (1656 bit) Reed-Solomon (RS) code-word by taking 2 bits at a time, trellis encoding them into 3 bits, then mapping each unit of 3 bits to an 8 level symbol from the set (−7 −5 −3 −1 +1 +3 +5 +7).

Another example of framing in a digital communications system is seen in the ISDB-T system. Unlike the single-carrier ATSC system, ISDB-T is a multi-carrier system utilizing coded orthogonal frequency division multiplexing ("COFDM"). For example, mode 1 for ISDB-T uses 1404 carriers. A frame consists of 204 COFDM symbols and each COFDM symbol can be thought of as a combination of 1404 independent QAM symbols, one for each of the carriers. Thus, the frame is composed of a combination of 204×1404=286416 QAM symbols. Of these, 254592 are data, and 31824 comprise both pilot information (which can be used for frame synchronization) and mode information which are scattered throughout the frame in a known pattern. A simplified view of this frame arrangement is shown in FIG. 4. It can be seen that the pilot and mode information is scattered about the frame in a known pattern.

This system has modes that utilize three different QAM constellations—QPSK, 16 QAM, and 64 QAM. It also supports five different trellis coding rates (1/2, 2/3, 3/4, 5/6, 7/8) based on a single punctured mother code. This well-known technique makes it very economical to construct a single Viterbi decoder in the receiver that can easily be adjusted to decode all five of the specified codes. Prior to trellis coding at the transmitter, the data is formed into 204 byte (1632 bits) long RS blocks. While the number of COFDM symbols per frame is always constant, the number of RS blocks per frame varies with the selected mode, but most importantly, that number is always an integer. This allows for easy RS block synchronization in the receiver once frame sync has been established and the trellis code rate is known. In order for this to be true, the number of data bits per frame prior to trellis coding must be evenly divisible by 1632 for all modes.

TABLE 1

Data Bits per Frame for ISDB-T

| mode | data bits/frame (before trellis coding) | | | | | bits/frame after trellis coding |
| --- | --- | --- | --- | --- | --- | --- |
| | ½ | ⅔ | ¾ | ⅚ | ⅞ | |
| QPSK | 254592 | 339456 | 381888 | 424320 | 445536 | 509184 |
| 16 QAM | 509184 | 678912 | 763776 | 848640 | 891072 | 1018368 |
| 64 QAM | 763776 | 1018368 | 1145664 | 1272960 | 1336608 | 1527552 |

Table 1, above, shows the number of data bits per frame for all the modes (combination of QAM constellation and trellis code rate). In every case the number of data bits per frame is evenly divisible by 1632 (data bits means bits before trellis coding).

BRIEF SUMMARY OF THE INVENTION

Certain embodiments of the invention provide systems used in digital signal processing and communication systems that comprise a phase offset corrector that receives an equalized signal representative of a quadrature amplitude modulated signal and that derives a phase-corrected signal from the equalized signal, a two-level slicer that slices the equalized signal to obtain real and imaginary sequences, a frame synchronizer that performs a correlation of the real and imaginary sequences with corresponding parts of a stored frame-sync pseudo-random sequence and a phase correction signal provided by the frame synchronizer to the phase offset corrector. The phase correction signal is based on the maximum real and imaginary values of the correlation. The frame synchronizer performs continuous cross-correlation on incoming sliced quadrature amplitude modulated symbols. The continuous cross-correlation is performed separately for the real and imaginary sequences with a stored copy of a binary frame-sync pseudo-random noise sequence.

The quadrature amplitude modulated signal is modulated using punctured trellis codes and the quadrature amplitude modulated signal may be modulated using quadrature phase shift keying modulation, 16-QAM, 64-QAM and so on. Frame sync symbols of the quadrature amplitude modulated signal have the same sign and the signs of the maximum real and imaginary values of the correlation are indicative of phase rotation in the equalized signal. The phase correction signal provided by the frame synchronizer comprises the signs of the maximum real and imaginary values of the correlation and the phase offset corrector derives the phase-corrected signal by indexing a lookup table with the signs of the maximum real and imaginary values of the correlation to determine a phase correction value.

In certain embodiments, methods comprise equalizing the signal, slicing the equalized signal, thereby obtaining real and imaginary sequences from the equalized signal, identifying a frame synchronization sequence in the real and imaginary sequences and correcting a phase error in the equalized signal based on the maximum correlation values. Identifying the frame synchronization sequence includes correlating a stored pseudo-random sequence with the real and imaginary sequences and determining a start of a frame from maximum correlation values associated with the real and imaginary sequences. The correlating step includes performing continuous cross-correlation on a series of sliced quadrature amplitude modulated symbols with a stored copy of a binary frame-sync pseudo-random noise sequence and may include performing continuous cross-correlation on a stored copy of the frame synchronization sequence separately with the real and imaginary sequences. Frame sync symbols of the frame synchronization sequence may have the same sign. Accordingly, correcting a phase error typically includes determining phase rotation in the equalized signal based on the signs of the maximum correlation values and indexing a lookup table with the signs of the real and imaginary maximum correlation values.

Certain embodiments of the invention provide systems and methods for correcting carrier phase offset in a quadrature amplitude modulated signal. In some of these embodiments, the method is implemented in a system comprising one or more processors configured to execute instructions executed on the one or more processors. Certain embodiments comprise storage media encoded with data and instructions which, when executed by the one or more processors cause the one or more processors to perform the described steps.

BRIEF DESCRIPTION OF THE DRAWINGS

FIG. 18 illustrates a transmitted symbol.

FIGS. 19A-19D illustrate possible recovered symbols based on the transmitted symbol of FIG. 18.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Figure 5:
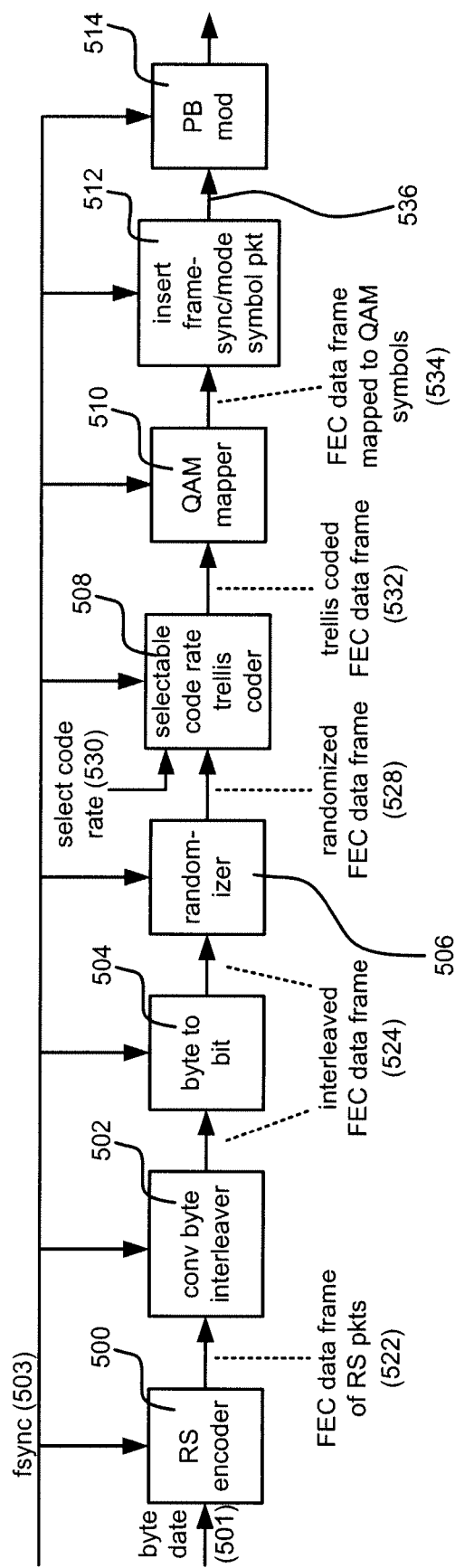
FIG. 5 is a block schematic of a modulator according to certain aspects of the invention.

Certain embodiments of the invention provide novel frame structures for a single carrier communication system. One frame structure according to certain aspects of the invention utilizes punctured trellis coding and QAM constellation combinations similar to those used in ISDB-T. The number of symbols per frame is a variable integer depending on the mode and the number of RS packets per frame is a constant integer regardless of mode. This arrangement simplifies the design of receiver processing blocks such as the de-randomizer and the de-interleaver because the number of RS packets per frame is always fixed. In conventional systems such as ISDB-T, the number of symbols per frame is constant and the number of RS packets per frame is a variable integer depending on the mode. The frame will be described with reference to an example depicted in FIG. 5 of a transmitter architecture that is constructed according to certain aspects of the invention.

Figure 6:
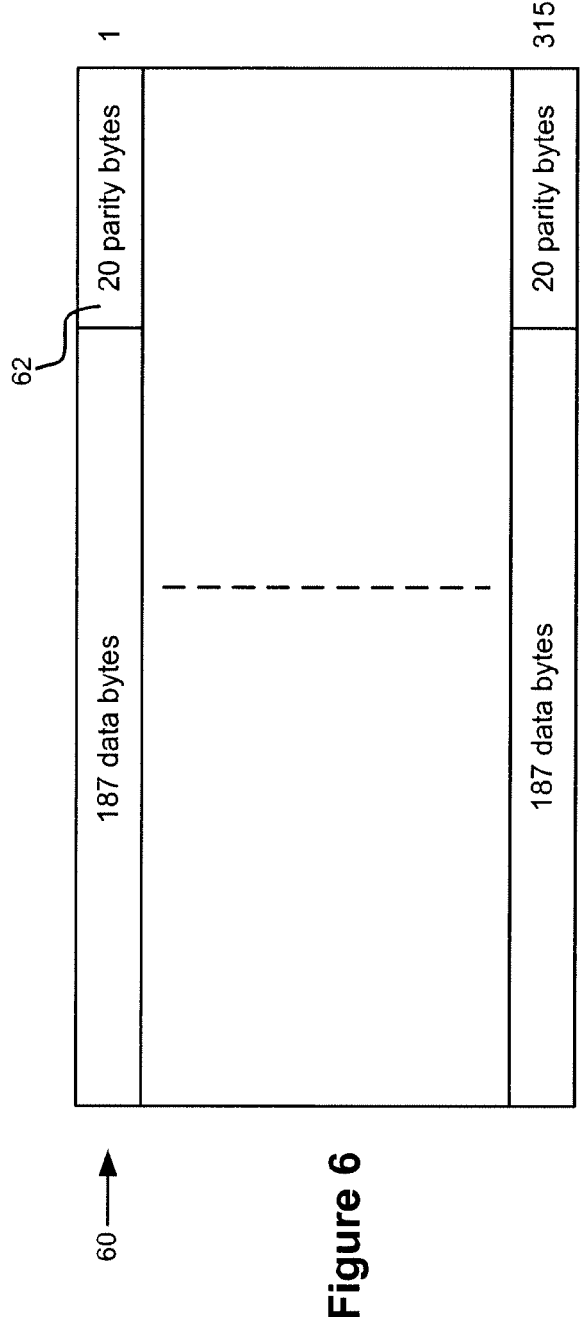
FIG. 6 is a block representation of a frame structure employed in certain embodiments of the invention.

An RS encoder 500 accepts byte data 501 and an externally generated frame sync signal that indicates the start of each group of 315 Reed-Solomon packets 522. As shown in FIG. 6, each packet 60 comprises 207 bytes, of which 20 are parity bytes 62. These 315 Reed-Solomon packets form forward error correction ("FEC") data frame 522 which contains 65205 bytes.

Figure 7:
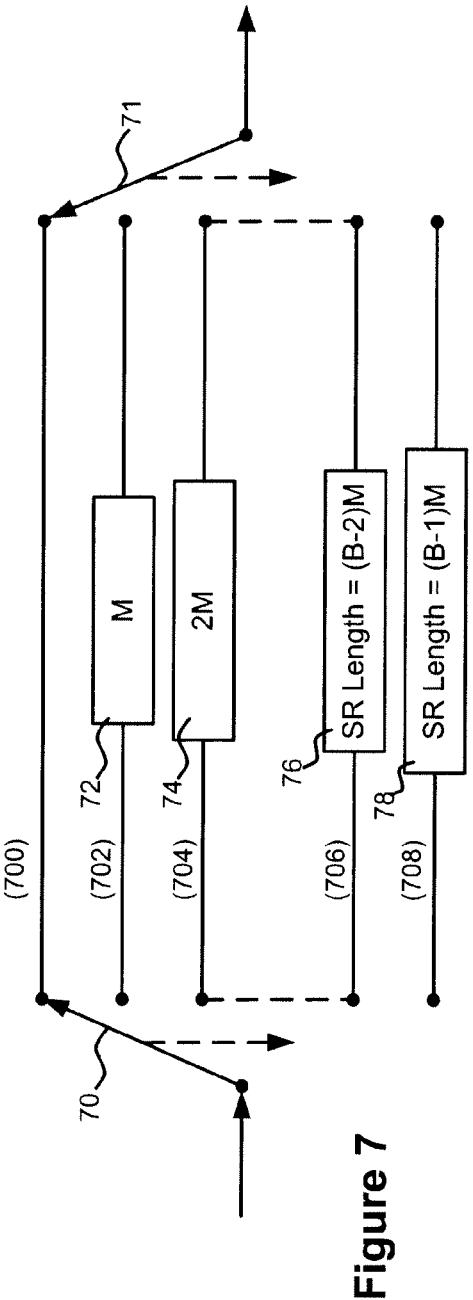
FIG. 7 illustrates operation of a convolutional byte interleaver in certain embodiments of the invention.

A convolutional byte interleaver 502 follows. FIG. 7 illustrates a mode of operation of interleaver 502 that combats impulse noise affecting the transmitted signal. The parameter B in paths 76, 78 is set to 207, and parameter M in paths 72, 74, 76 and 78 is set to 1. Frame sync signal 503 forces input and output commutators 70 and 71 to the top position 700, thus synchronizing the interleaving to the frame structure. Input and output commutators 70 and 71 move down one position 702 as a byte enters the interleaver and a different byte exits the interleaver. When commutators 70 and 71 reach the bottom 708, they shift back to the top 700. Each of the B parallel paths 706, 708 contains a shift register 76 and 78 having the length shown in the FIG. 7.

A randomizer 506 produces a randomized FEC data frame 528 by operating on the 65205×8=521640 bits of the FEC data frame 524 by executing an exclusive or operation on those bits with a PN (pseudo-random noise) sequence of length $2^{19}-1$ which is shortened by resetting the PN sequence generator at every frame sync time.

Figure 8:
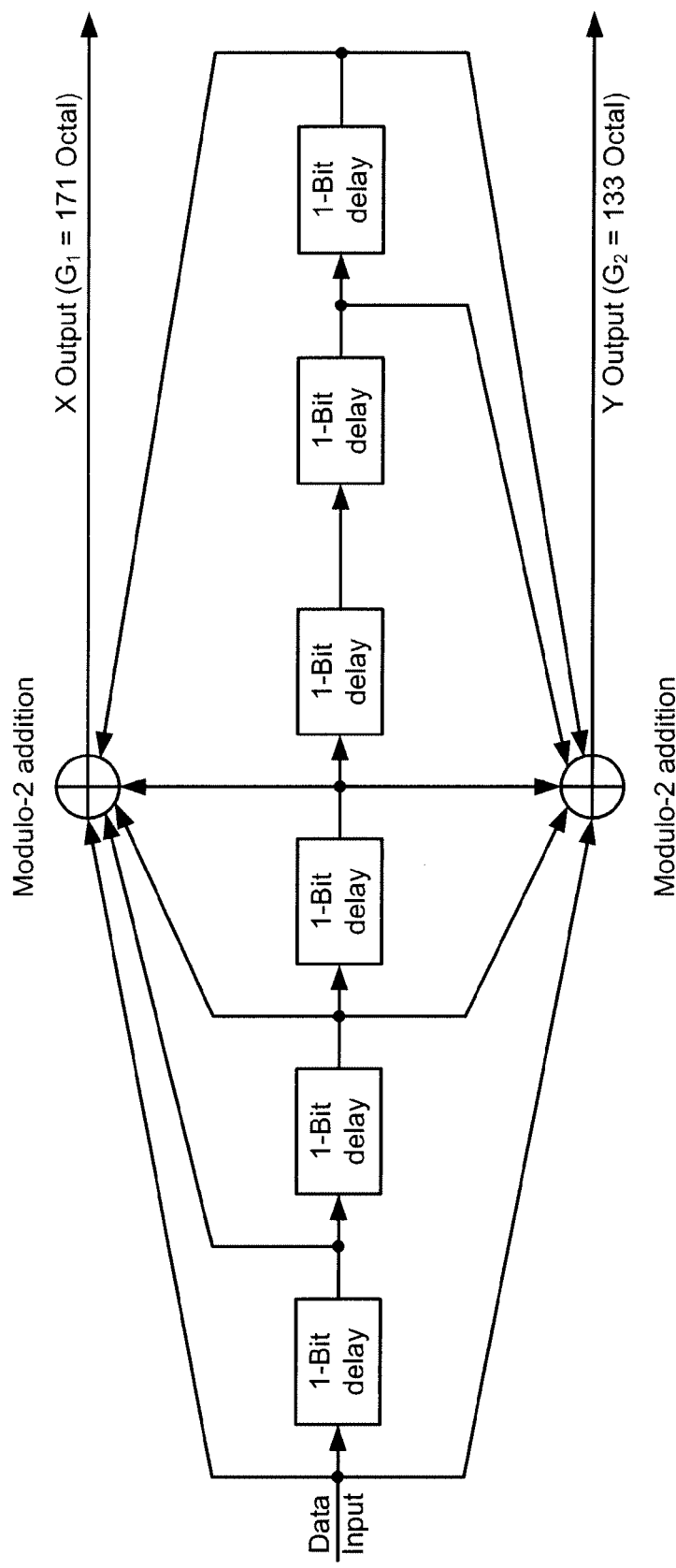
FIG. 8 is a block schematic of a selectable code rate punctured trellis coded modulation employed in certain embodiments of the invention.

Selectable code rate punctured trellis coded modulation ("PTCM") module 508 is shown in more detail in FIG. 8. PTCM 508 uses a method known to those of skill in the art. The method that starts with a 64 state ½ rate coder and executes puncturing to achieve any one of 5 different code rates. In certain embodiments, the PTCM 508 can also be completely bypassed (code rate=1). This allows for a selectable trade off between net bit rate and white noise performance for the system. Similar trellis coding techniques are used in ISDB-T and DVB-T systems. PTCM produces two bits 532 at the output for every bit provided to the input 528. However, some of the output bits 532 are discarded according to the selected code rate and corresponding puncture pattern.

Figure 9:
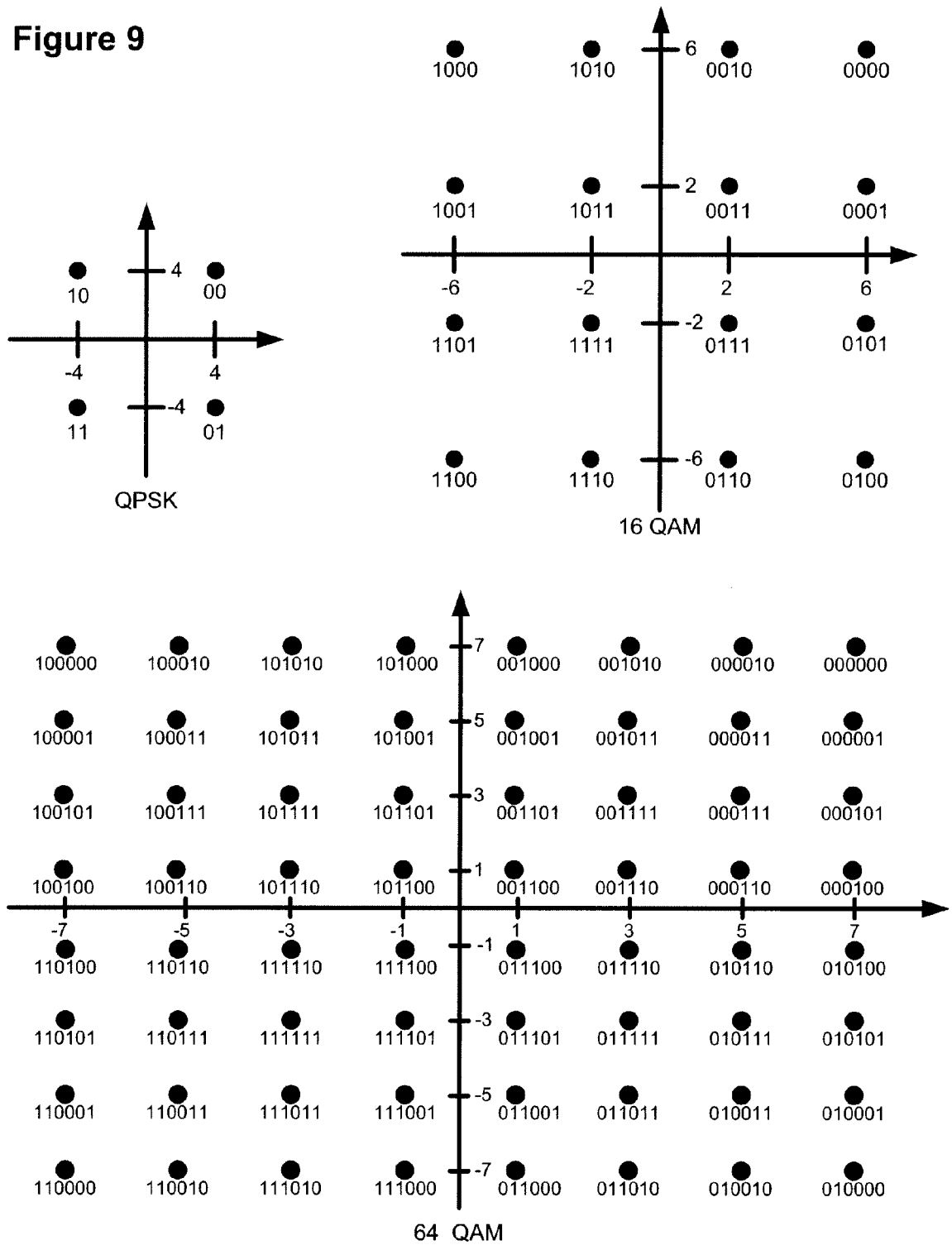
FIG. 9 illustrates examples of QAM mappings.

QAM mapper 510 takes the bits in groups of 2, 4 or 6 from the coder output 532 and maps them into QPSK, 16 QAM, or 64 QAM symbols respectively. Examples of such mappings are provided in FIG. 9.

Figure 10:
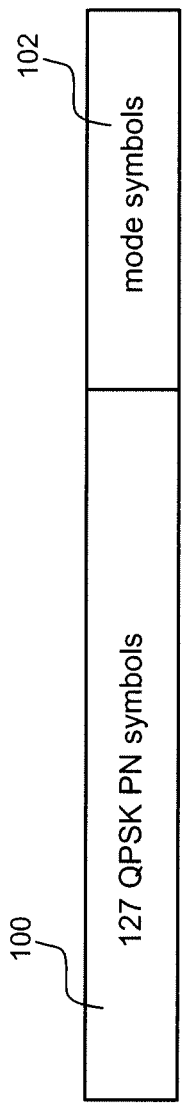
FIG. 10 shows a frame sync/mode packet.

Module 512 adds a frame-sync/mode symbol packet (all symbols are QPSK) to the start of each FEC data frame 534. With reference to FIG. 10, the first part 100 of this packet comprises 127 symbols and consists of an identical binary PN sequence for both the real and imaginary parts of the symbols. Other PN sequence lengths are possible, and the real and imaginary parts can have the opposite sign. The second part 102 of this packet consists of data that indicate the transmission mode—the selected QAM constellation and the selected trellis code rate. This mode data can be encoded using a block error correction code for added reliability at the receiver. Methods that can be employed include BCH coding and other block codes. In one example, 6 possible trellis code rates including bypass are possible. Additionally, three constellations are possible resulting in 18 modes. Accordingly, 5 bits are needed to represent each of the possible mode selections. The 5 bits could be encoded into a 16 bit code word using an extended BCH code. Since each QPSK symbol contains 2 bits, 8 mode symbols would be required.

Figure 11:
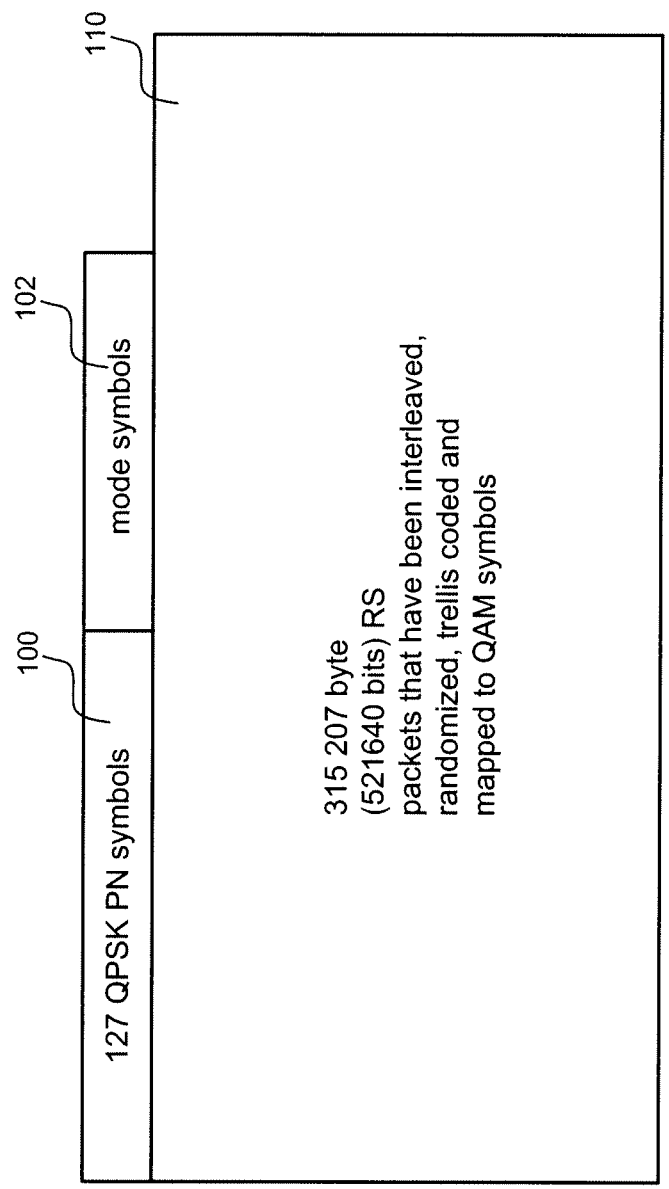
FIG. 11 is a simplified frame structure employed in certain embodiments of the invention.

FIG. 11 illustrates a frame structure 536 provided to passband modulation ("PB Mod") module 514. Packets 110 comprise 315 RS packets (521640 bits). The number of QAM symbols to which the 315 RS packets 110 are mapped can vary with the mode selection. The PB Mod module 514 then modulates the baseband QAM symbols to passband using any suitable method known to those with skill in the art.

Frame structures according to certain aspects of the invention advantageously overcome certain shortcomings and failings of conventional frames. In particular, the frame structure offers for all modes:
- a constant integral number of RS packets per frame regardless of mode, and
- the number of QAM symbols per frame is a variable integer for all modes
- an integral number of puncture pattern cycles per frame for all modes Note that providing an integer number of QAM symbols per frame is not a trivial accomplishment because the FEC data frame must exactly comprise I×207 data bytes where I is a selected integer in order to have a fixed integral number of RS packets per frame. Accordingly, the number of data bits per frame prior to trellis coding must not only be an integer, but the number must be evenly divisible by 207×8=1656 for all modes. Furthermore, the number of trellis coder output bits per QAM symbol is 2, 4 and 6 bits respectively for QPSK, 16 QAM and 64 QAM (See Table 2. which shows a code rate=1 for trellis code bypass). Additionally, trellis coding adds bits. The number of data bits per symbol prior to trellis coding is shown in Table 2, where each entry is calculated as:

right-most column entry/code how the puncture pattern aligns with the data. The bit-wise puncture patterns applied at the output of the mother code trellis coder are indicated in the second column of the table in FIG. 8. The number of 1's in each puncture pattern is the puncture pattern length. In the proposed system the puncture pattern always lines up with the start of the FEC data frame. This allows the use of frame sync in the receiver to properly align the de-puncturer in the receiver Viterbi decoder with the bit stream. The desired alignment is indicated in Table 4 which shows an integral number of pp/frame for all modes. The puncture pattern per symbol ("pp/symbol") entries can be calculated as:

pp length/# of trellis coder output bits per symbol

The pp/frame entries can be calculated as:

symbols per frame from table 3/pp/symbol

TABLE 4

Puncture Patterns per Frame

| code rate | pp length | QPSK (2 bits/sym) pp/symbol | QPSK (2 bits/sym) pp/frame | 16 QAM (4 bits/sym) pp/symbol | 16 QAM (4 bits/sym) pp/frame | 64 QAM (6 bits/sym) pp/symbol | 64 QAM (6 bits/sym) pp/frame |
|---|---|---|---|---|---|---|---|
| ½ | 2 | 1 | 521640 | 2 | 521640 | 3 | 521640 |
| ⅔ | 3 | ⅔ | 260820 | 4/3 | 260820 | 2 | 260820 |
| ¾ | 4 | ½ | 173880 | 1 | 173880 | 3/2 | 173880 |
| ⅚ | 5 | ⅓ | 104328 | ⅔ | 104328 | 1 | 104328 |
| ⅞ | 8 | ¼ | 74520 | ½ | 74520 | ¾ | 74520 |
| 1 | NA | NA | NA | NA | NA | NA | NA |

TABLE 2

Data Bits per Symbol (input bits to trellis coder per mapped QAM symbol)

| | trellis code rates | | | | | |
|---|---|---|---|---|---|---|
| constellation | ½ | ⅔ | ¾ | ⅚ | ⅞ | 1 |
| QPSK | 1.00 | 4/3 | 1.50 | 5/3 | 1.75 | 2.00 |
| 16 QAM | 2.00 | 8/3 | 3.00 | 10/3 | 3.50 | 4.00 |
| 64 QAM | 3.00 | 4.00 | 4.50 | 5.00 | 5.25 | 6.00 |

The fact that the number of data bits per symbol can be fractional requires that the RS packet size and the number of RS packets per frame be precisely selected. With RS packet size of 207 and 315 packets per frame an integral numbers of symbols per frame is attained. As shown in table 3, each entry can be calculated as:

number of data bits per frame/number of data bits per symbols =521640/entry from table 2

TABLE 3

Symbols per Frame

| | trellis code rates | | | | | |
|---|---|---|---|---|---|---|
| constellation | ½ | ⅔ | ¾ | ⅚ | ⅞ | 1 |
| QPSK | 521640 | 391230 | 347760 | 312984 | 298080 | 260820 |
| 16 QAM | 260820 | 195615 | 173880 | 156492 | 149040 | 130410 |
| 64 QAM | 173880 | 130410 | 115920 | 104328 | 99360 | 86940 |

This frame provides the additional advantage that there are an integral number of puncture pattern cycles per frame (pp/frame) for all modes. In order to correctly decode the punctured trellis coded data, the decoder in the receiver must know It will be appreciated that other combinations of RS packet sizes and numbers of packets per frame can be used to obtain the same desired result. The numbers provided herein are described for purposes of illustration only.

Figure 12:
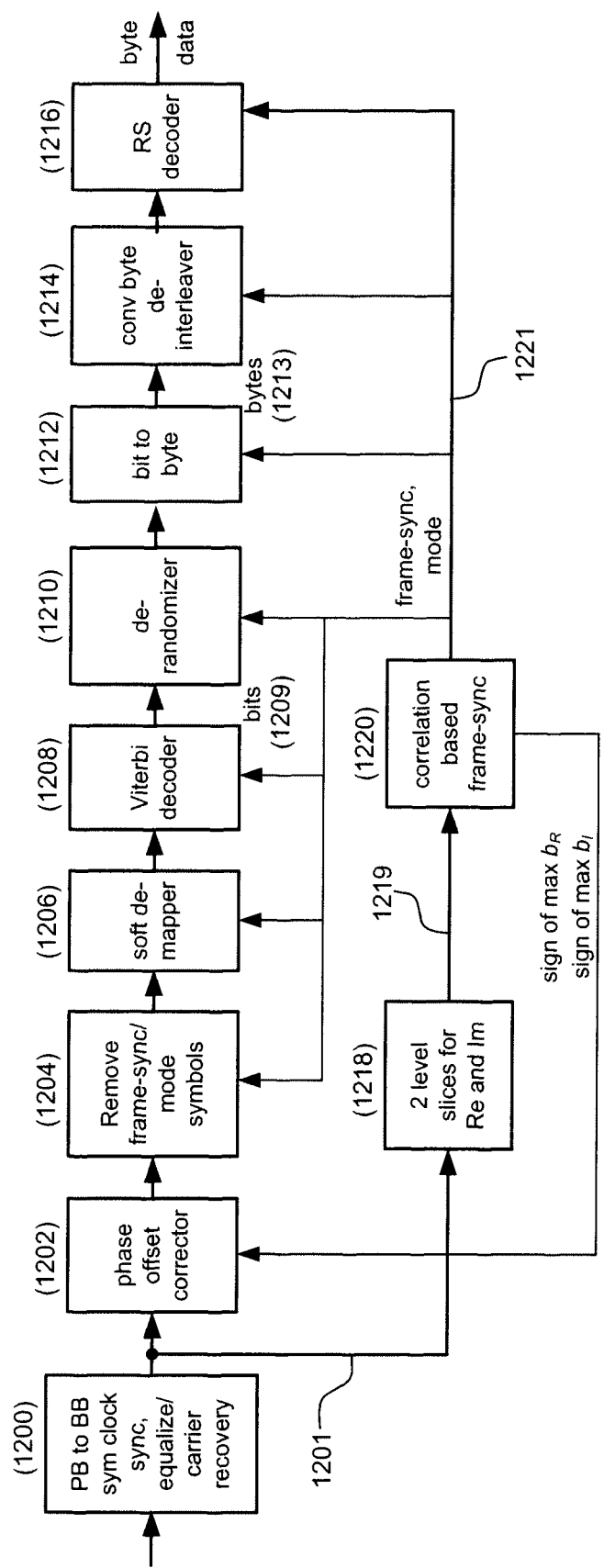
FIG. 12 is a block schematic of a demodulator according to certain aspects of the invention.

As shown in FIG. 12, certain embodiments of the invention provide a receiver architected to handle a frame structured according to certain aspects of the invention. Module 1200 receives and converts transmitted data in a passband signal to baseband QAM symbols. The operations performed by module 1200 can include symbol clock synchronization, equalization (to remove inter-symbol interference) and carrier recovery, typically using sub-modules. Accordingly, module 1200 may comprise an equalizer that outputs recovered baseband QAM symbols 1201. Baseband QAM signals 1201 are provided to two-level slicer 1218 for slicing in both the real and imaginary directions, thereby forming the sequences $\alpha_R[k]\epsilon[-1,+1]$ and $\alpha_I[k]\epsilon[-1,+1]$ 1219 which are provided to frame-sync module 1220.

Frame sync module 1220 performs a continuous cross-correlation operation on the incoming sliced QAM symbols 1219, separately for both the real and imaginary parts, with a stored copy of the binary frame-sync PN sequence. Each member of the stored copy has a value of −1 or +1. This operation is given by:

$$b_R[k] = \sum_{n=0}^{126} s[n]a_R[n-k] \text{ and } b_I[k] = \sum_{n=0}^{126} s[n]a_I[n-k]$$

where s is the stored copy in the 127 long frame-sync PN sequence. The maximum magnitude of either $b_R$ or $b_I$ indicates the start of the FEC data frame.

Once the frame sync start position is located, the position of the code words containing the mode bits (constellation and trellis code rate) is known. The code words can be reliably decoded by, for example, a BCH decoder or by correlating the received code word with all the possible code words and choosing the code word yielding the highest resulting value. Since this information is sent repeatedly, additional reliability can be obtained by requiring that the same result occur multiple times before it is accepted.

This derived frame-sync signal 1221 is used to indicate which symbols are to be removed in "remove frame-sync/mode symbols" module 1204 before symbols are fed to soft de-mapper 1206. In one example, 127 frame-sync symbols and 8 mode symbols are removed from the stream ensuring that only symbols corresponding to the RS packets are passed to soft de-mapper 1206.

Soft de-mapper 1206 calculates soft bit metrics using algorithms that are known in the art including, for example, algorithms described by Akay and Tosato. For correct operation, soft de-mapper 1206 must know which puncture pattern (which trellis code rate) was used in the transmitter and also the alignment of that pattern with the received bits. This information 1221 is provided by frame-sync module 1220 which decodes the mode information and also provides a repeating frame sync signal to which the puncture pattern is aligned, regardless of the current mode. These soft bit metrics are fed to Viterbi decoder 1208 that operates in a manner known in the art to arrive at estimates of the bits that were input to the PTCM encoder in the transmitter.

De-randomizer 1210, byte de-interleaver 1214, and RS decoder 1216, which are all synchronized by the frame-sync signal 1221, respectively de-randomize, de-interleave, and decode the byte data to obtain the data that originally entered the RS encoder in the transmitter.

Baseband to Passband Modulation

Figure 13:
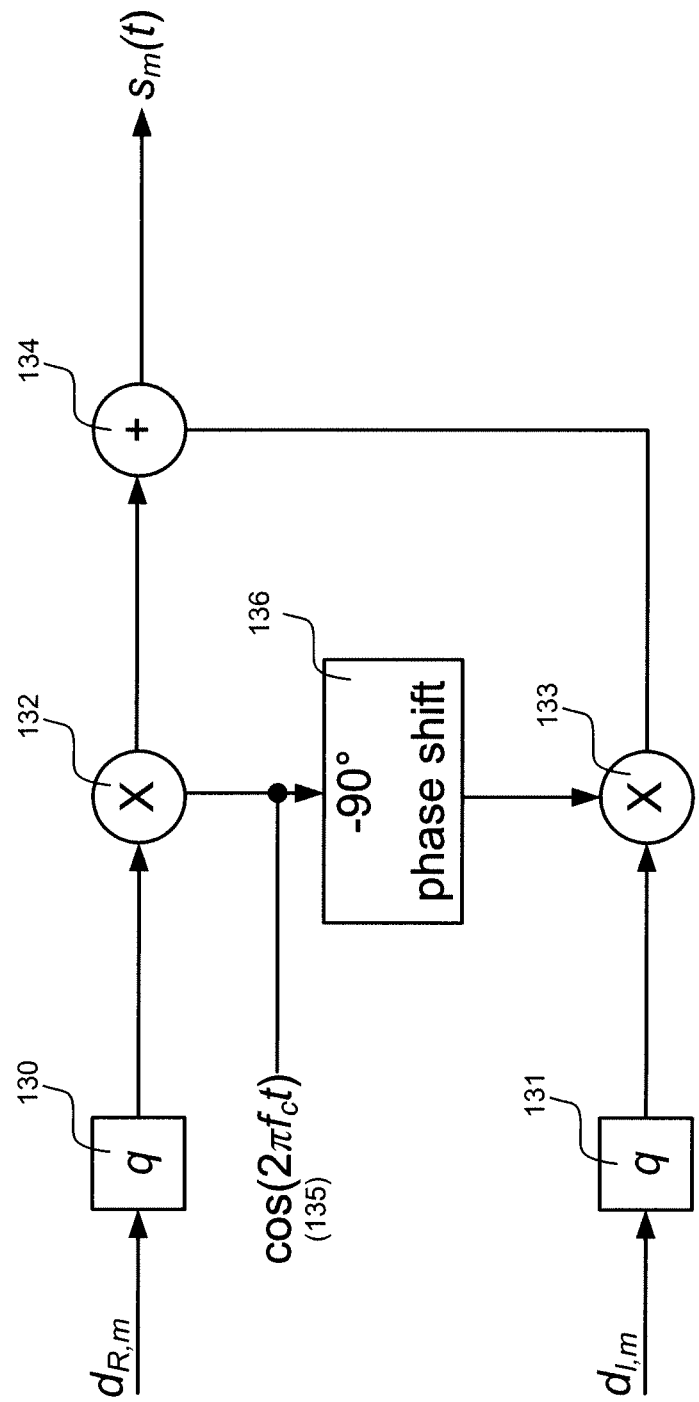
FIG. 13 depicts a simplified QAM modulator according to certain aspects of the invention.

Certain wireless digital communication systems, including broadcast, wireless LAN, and wide area mobile systems, employ QAM in some form. QAM is also used in both the North American and European digital cable television standards using quadrature-carrier multiplexing that enables two double-side-band suppressed-carrier modulated waves to occupy the same channel bandwidth, with each wave modulated by an independent message. FIG. 13 depicts a simple QAM modulator that may serve as PB mod 514 in the example of FIG. 5. An isolated transmitted QAM pulse is given by:

$$s_m(t) = d_{R,m} q(t) \cos(2\pi f_c t) - d_{I,m} q(t) \sin(2\pi f_c t) = Re\{d_m q(t) e^{j2\pi f_c t}\},$$

where $d_{R,m}$ and $d_{I,m}$ are determined by two independent message streams and represent the real and imaginary parts respectively of a complex QAM symbol (see, e.g., FIG. 9), with m=/1 ... M indexing a 2-dimensional QAM constellation of cardinality where M is the modulating carrier frequency, and q(t) is a root raised cosine pulse function.

A continuous series of transmitted QAM pulses s(t), at a rate of $F_s = 1/T_s$, passes through a noisy multipath channel. Thus, the received signal at the input to the QAM receiver is given by r(t)=s(t)*c(t)+v(t), where * denotes convolution, c(t) is the channel impulse response, and v(t) is additive white Gaussian noise.

Thus, $$r(t) = Re\left\{ e^{j2\pi(f_{LO}+f_o)t+\theta_o} \sum_{n=-\infty}^{+\infty} [d[n] * q(t)] c(t-nT_S) \right\} + v(t),$$

where d[n] is the complex transmitted symbol, $f_o$ and $\theta_o$ are the frequency and phase offsets respectively of the receiver passband to baseband demodulator local oscillator with respect to the transmitter, such that $f_{LO} = f_c - f_o$.

Passband to Baseband Demodulator

Figure 17:
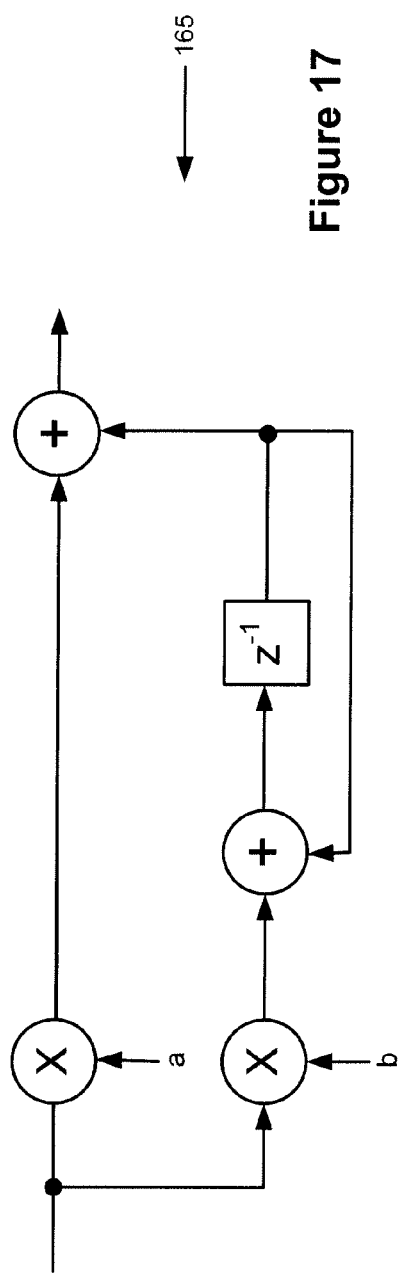
FIG. 17 depicts an integral-proportional ("IP") filter.

FIG. 17 shows the PB to BB, sym clock sync, equalizer/carrier recovery module 1200 of FIG. 12 in more detail. The received signal r(t) is sampled 170 at a rate higher than the symbol rate, resulting in the sampled signal $r(nT_{samp})$. After sampling:

$$r(nT_{samp}) = Re\left\{ e^{j2\pi(f_{LO}+f_o)nT_{samp}+\theta_o} \sum_{m=-\infty}^{+\infty} [d[m] * q(nT_{samp})] c(nT_{samp} - mT_s) \right\} + v(nT_{samp}).$$

Then, after demodulation, resampling at the symbol rate $1/T_S$ and matched filtering obtains:

$$x(kT_s) = x[k] = e^{j2\pi f_o kT_s + \theta_o} \sum_{m=-\infty}^{+\infty} d[m]c[k-m] + v'[k],$$

where v'[k] is sampled complex filtered noise. This assumes that, due to the pulse shaping and matched filtering q, combined with perfect symbol rate sample timing, any ISI is due only to the channel impulse response c.

After demodulation, assuming perfect equalization, the near baseband complex sequence z(k) at the equalizer output is given by:

$$z[k] = \hat{d}[k] e^{j2\pi f_o kT_S + \theta^o} + v'[k]$$

Thus, the recovered near baseband sequence represents the transmitted constellation, with a phase offset $\theta_o$, rotating at a frequency $f_o$. In order to reliably recover the transmitted $d_R$ and $d_I$, using for example, a two-dimensional slicer, the equalizer, combined with a phase and frequency offset recovery loop, must remove the frequency offset $f_o$ that causes the constellation to rotate, and the receiver must remove the remaining static phase offset of $\theta_o$ which would otherwise leave the constellation in a static rotated position.

Figure 1:
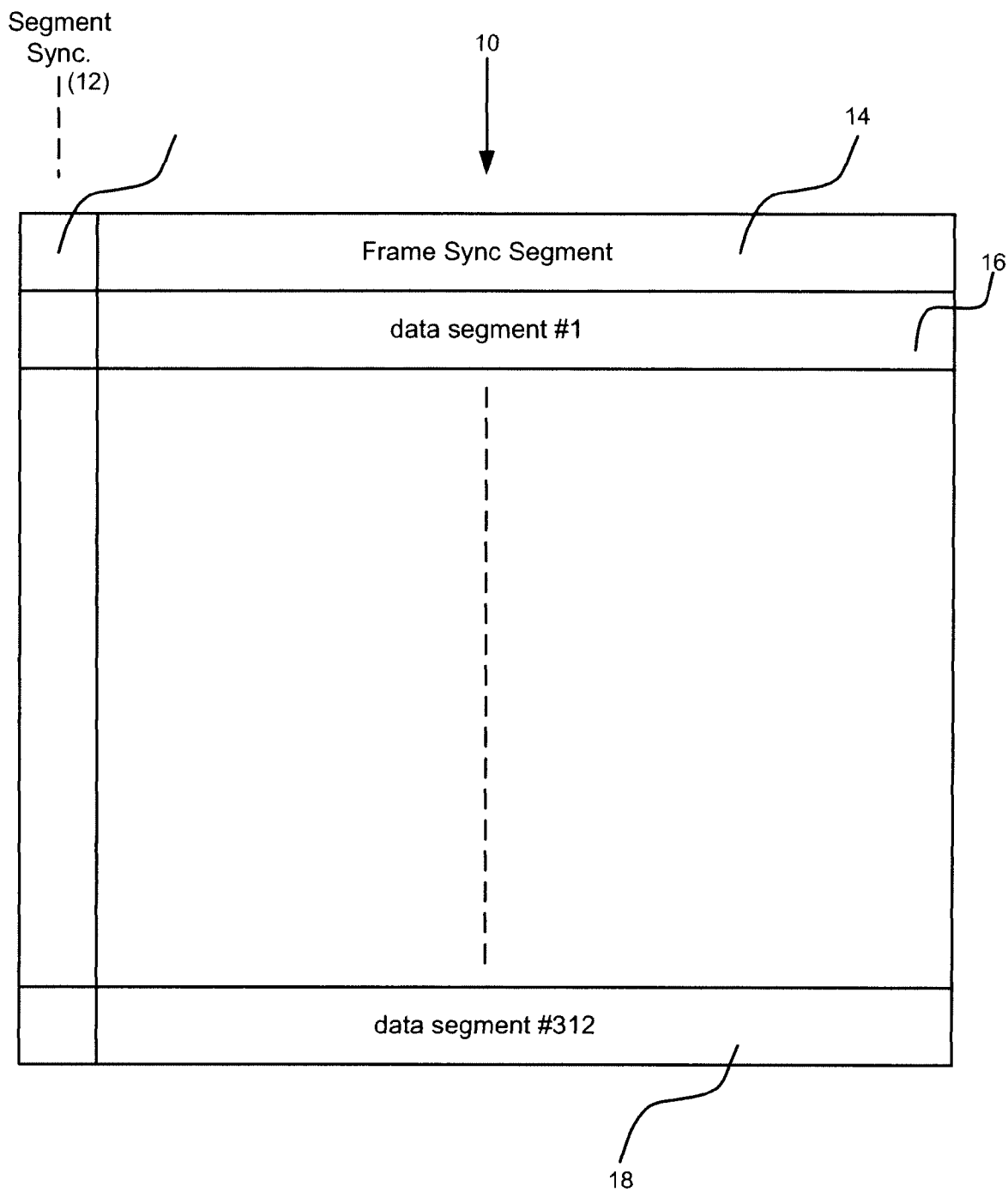
FIG. 1 is an example of a frame structure used in ATSC digital television.
Figure 2:
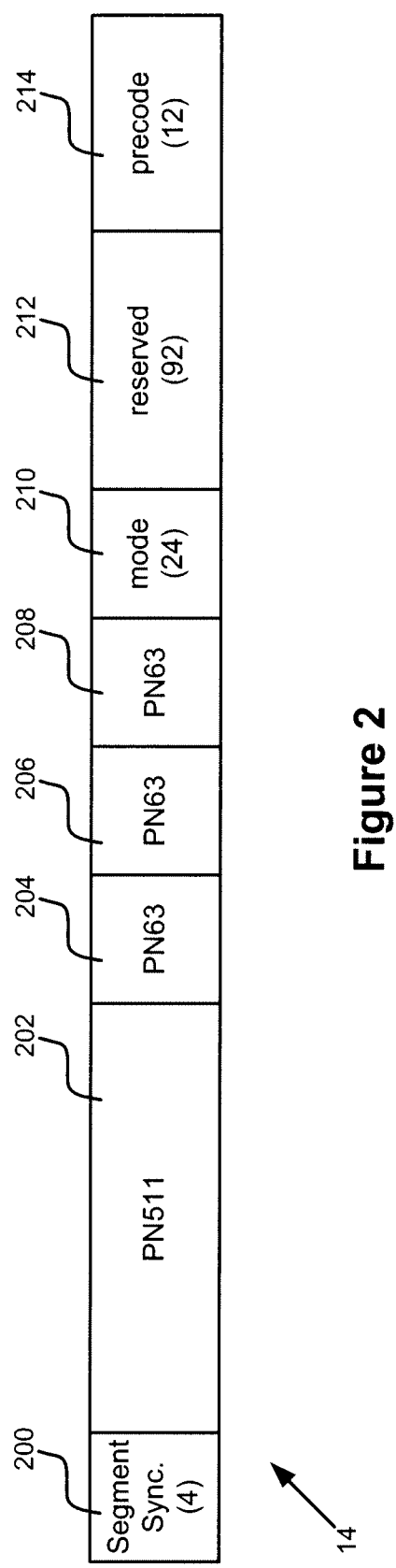
FIG. 2 is an example of a conventional frame synchronization packet.
Figure 3:
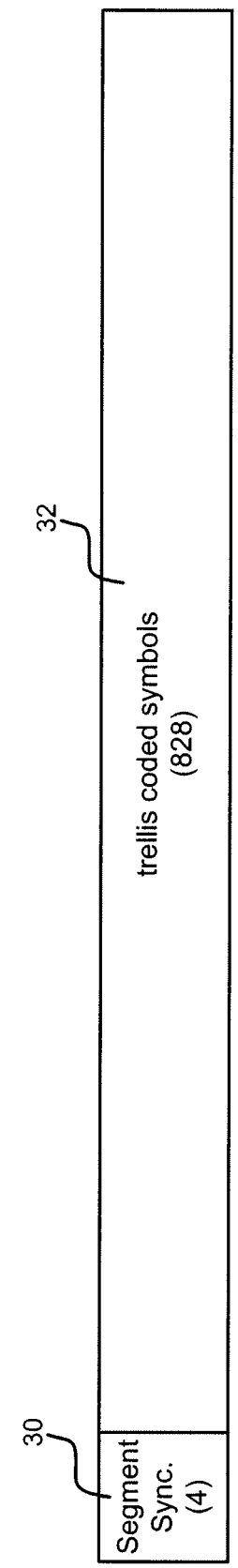
FIG. 3 is an example of a data segment in a conventional data frame.
Figure 4:
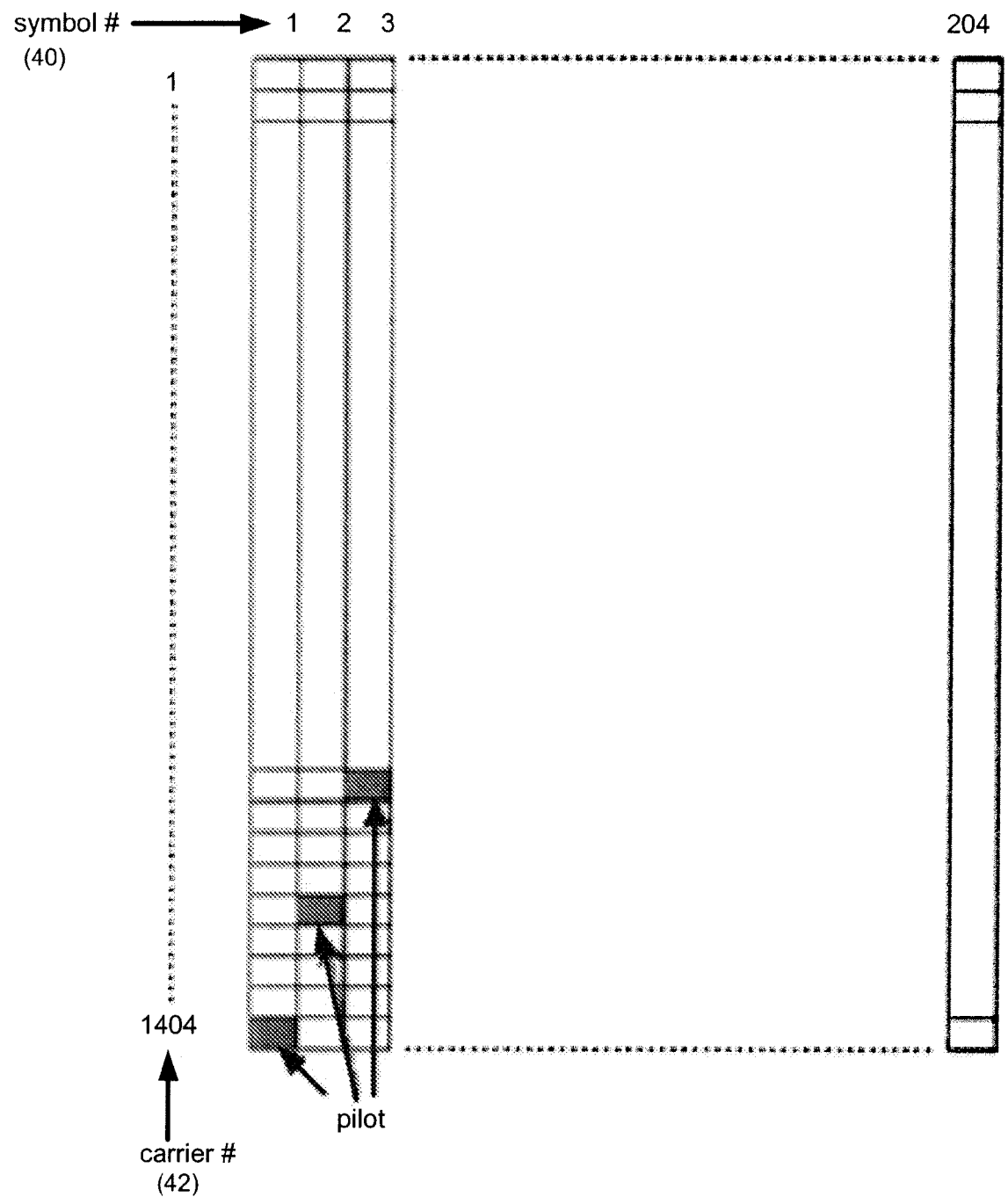
FIG. 4 provides a simplified view of a frame arrangement.
Figure 15:
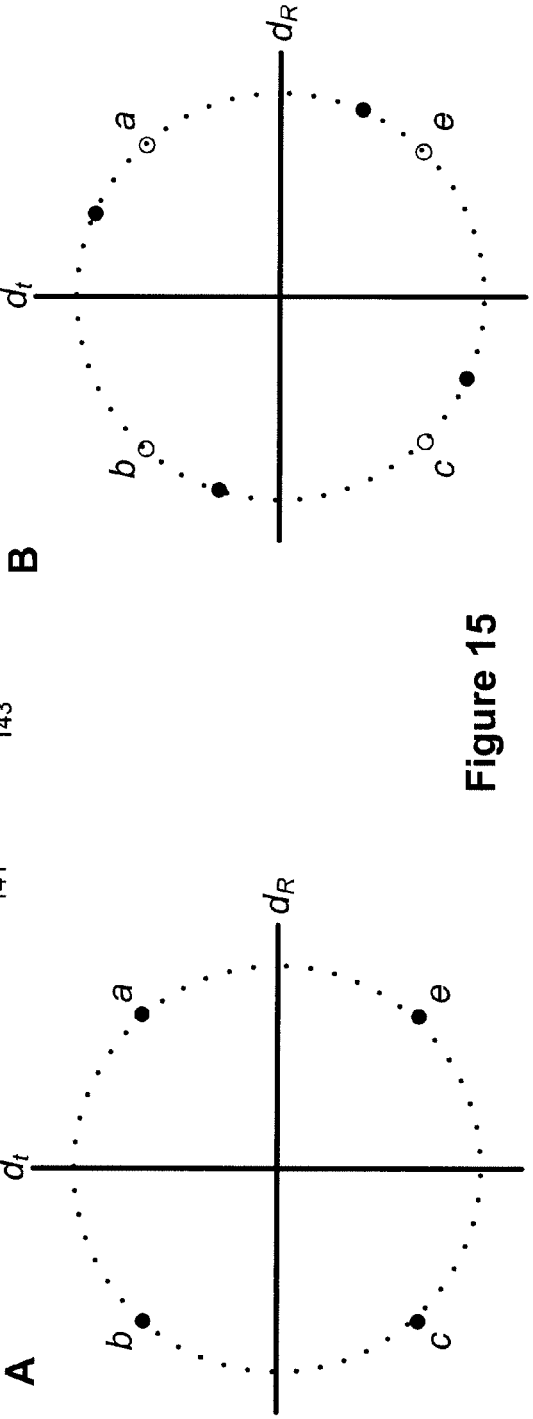
FIGS. 15a and 15b are QPSK constellations illustrating rotation in the complex plane.

In order to understand the phase/frequency recovery the QAM constellation at baseband must be understood. In the simple example of FIG. 15a, 4 QAM modulation, which is also known as QPSK, the constellation consists of four symbols. In the depicted example, the real and imaginary parts of d[k] can each take on 2 different values (such as +/−3). The effect of phase offset, $\theta_o$, on the recovered d[k], is shown in FIG. 15b which shows a rotation in the complex plane. The effect of $f_o$ is understood by noting that that the rotation proceeds in time in a circle, either counterclockwise or clockwise depending on the sign of $f_o$.

Equalizer and Carrier Phase/Frequency Loop

Figure 14:
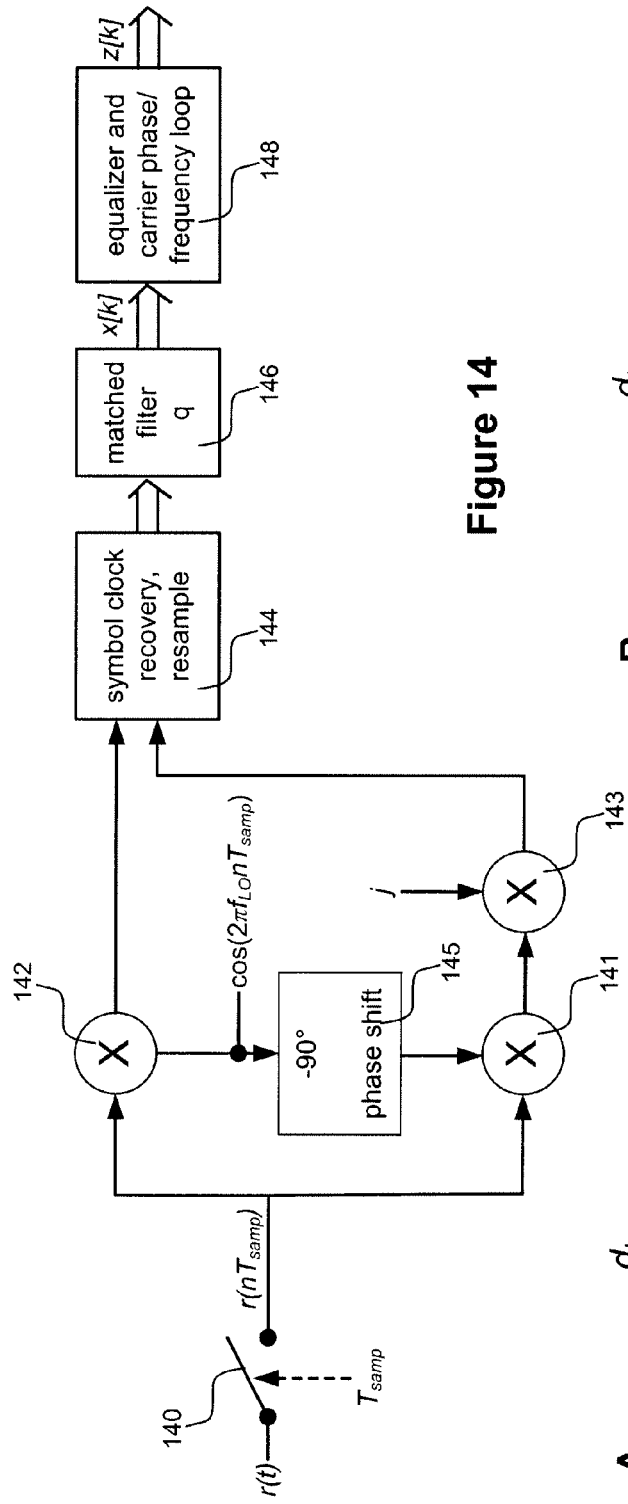
FIG. 14 is a block schematic showing initial processing of a signal received by a system according to certain aspects of the invention.
Figure 16:
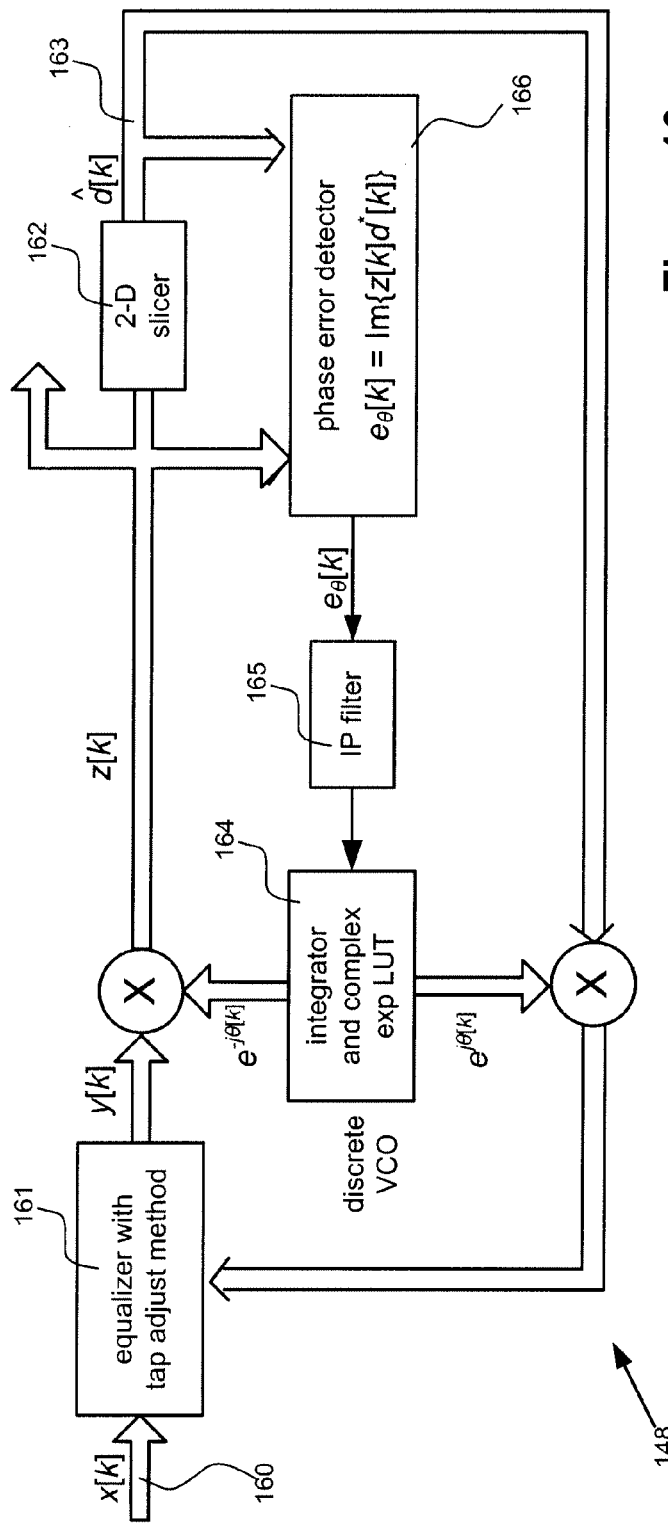
FIG. 16 is a block schematic illustrating phase correction processes according to certain aspects of the invention.

In FIG. 16, a signal x[k] 160 is received by a digital equalizer and carrier phase/frequency loop 148 (see FIG. 14). Equalizer 161 component typically comprises a linear digital filter and, using a proprietary or well-known method such as the least mean square ("LMS") algorithm, the equalizer compares its output y[k] with a phase rotated version of the slicer decision d̂[k] 163 to create an error signal which is used to calculate an updated set of filter tap weights. This filter removes the ISI caused by the channel impulse response c.

The 2-D slicer 162 independently slices the real and imaginary parts of z[k] and outputs d̂[k], which is an estimate of the originally transmitted d[k]. Both z[k] and d̂[k] enter the phase error detector module 166 and form a phase error signal given by $e_\theta[k] = Im\{z[k] \hat{d}^*[k]\}$. An integral-proportional ("IP") filter 165 can comprise the filter of FIG. 17 or any equivalent known to those skilled in the art. IP filter 165 permits the loop to correct both phase and frequency offsets. An output of IP filter 165 feeds a complex voltage controlled oscillator (VCO) 164 that outputs a complex phase/frequency correction factor $e^{-j\Theta[k]}$ which corrects for both $\theta_o$ and $f_o$. VCO 164 also outputs $e^{+j\Theta[k]}$ to "un-correct" the slice output d[k] so that it can be used to derive an error signal for the equalizer tap update. Such approach is indicated because the equalizer operates on x[k] which contains both $\theta_o$ and $f_o$.

Figure 20:
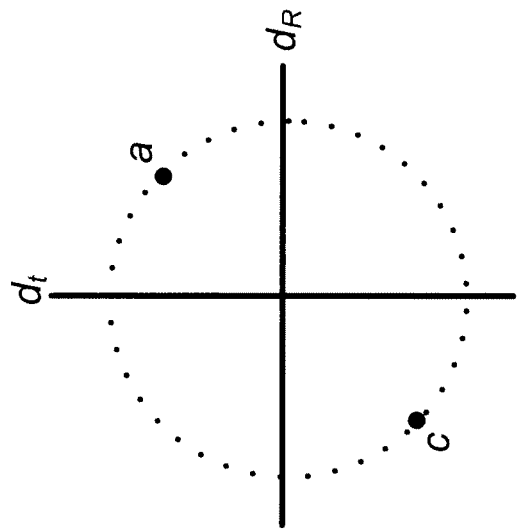
FIG. 20 shows an example of phase shift in a received symbol.

In certain embodiments, efficiencies can be gained by implementing VCO 164 in discrete form as a delay of one integrator feeding a complex exponential look-up-table ("LUT"). However, the final correction for $\theta_o$ can have an ambiguity of $\pi/2$, which means that the recovered phase may be correct (offset=0), or can have an offset of $\pi/2$, an offset $\pi$, or an offset of $3\pi/4$. These results are illustrated in FIGS. 18 and 19: an actual transmitted symbol is shown in FIG. 18 and the possible recovered symbols with respective offsets are shown in FIGS. 19a through 19d. Typically, the receiver cannot know which of the four possible symbols was actually transmitted because the 2-D slicer 162 executes a nearest neighbor operation. FIG. 20 demonstrates an instance in which a transmitted symbol α is received as α' at the equalizer input with $\theta_o$ as depicted. Accordingly, the phase recovery loop can rotate the signal to compensate for $\theta_o$ so that α' lines up with α. However, the decision of the 2-D slicer 162 will be that the correct symbol is b because it is closer to α'. This can cause the phase recovery loop to converge in a manner that rotates the constellation such that α' lines up with b. In this case the final phase is offset $-\pi/2$ from where it should be.

Certain embodiments of the invention provide methods for minimizing and/or eliminating such problems in trellis coded systems, including the family of punctured trellis codes used in certain of the presently described embodiments. As stated above, the output of the equalizer is sliced in both the real and imaginary directions by a 2-D level slicer 162 forming the sequences $\alpha_R[k]\epsilon[-1,+1]$ and $\alpha_I[k]\epsilon[-1,+1]$, which are fed to a frame-sync module 1220 (see FIG. 12). The frame sync module 1220 performs a continuous cross-correlation operation on the incoming sliced QAM symbols, separately for both the real and imaginary parts, with a stored copy of the binary frame-sync PN sequence. Each member of the stored copy has a value of −1 or +1. This operation may be characterized thus:

$$b_R[k] = \sum_{n=0}^{126} s[n]a_R[n-k] \text{ and } b_I[k] = \sum_{n=0}^{126} s[n]a_I[n-k],$$

where s is the stored copy of the 127-long frame-sync PN sequence. The maximum magnitude of either $b_R$ or $b_I$ indicates the start of the FEC data frame.

TABLE 5

| Sign of max $b_R$ | Sign of max $b_I$ | Phase correction needed |
|---|---|---|
| + | + | 0 |
| − | + | $+\pi/2$ |
| − | − | $+\pi$ |
| + | − | $-\pi/2$ |

Figure 21:
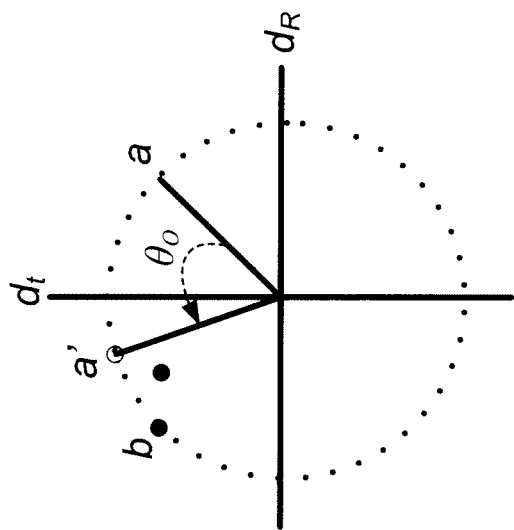
FIG. 21 shows typical real and imaginary parts of frame-sync symbols.

For the frame sync symbols, the real and imaginary parts have the same sign and their constellation is shown in FIG. 21. Thus, it can be appreciated that, the signs of the maximum magnitude $b_R$ or $b_I$ are both positive for zero rotation. A $-\pi/2$ rotation yields a negative maximum magnitude $b_R$ and a positive maximum magnitude $b_I$. For a rotation of $\pi$ both $b_R$ and $b_I$ are negative and, for a rotation of $\pi/2$, the maximum magnitude $b_R$ is positive and the maximum magnitude $b_I$ is negative.

Figure 22:
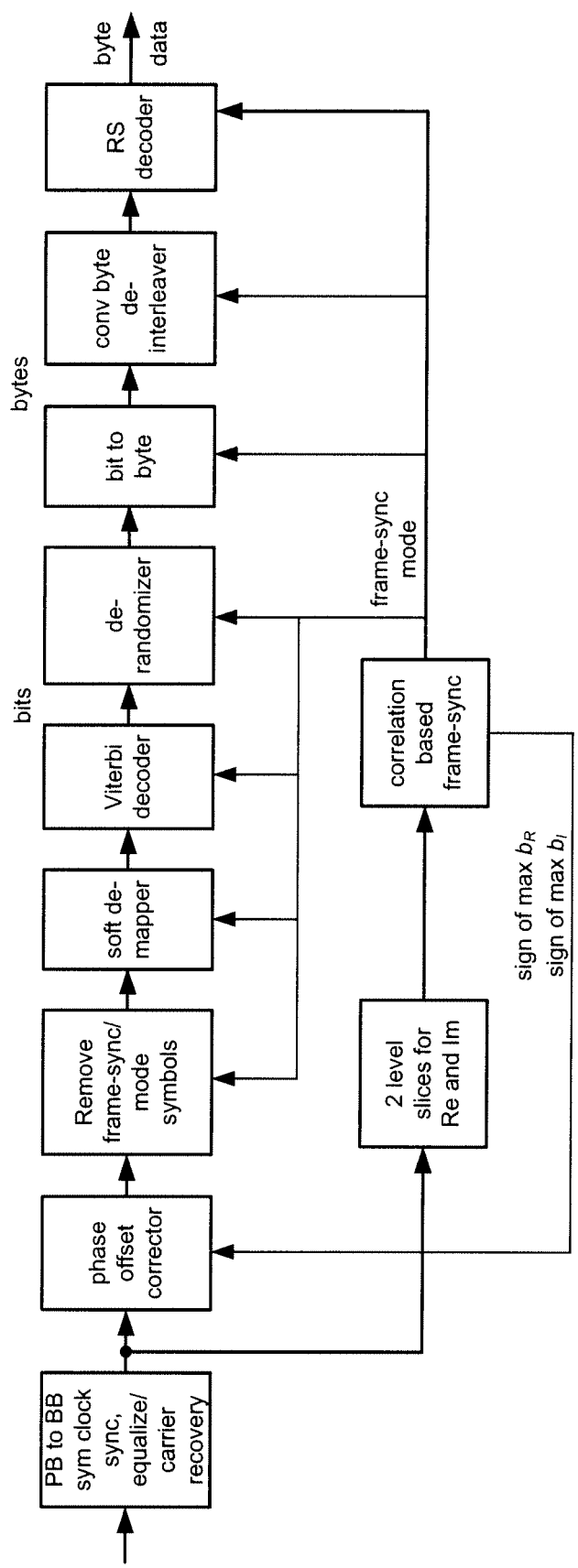
FIG. 22 depicts the operation of a phase offset corrector module according to certain aspects of the invention.
Figure 23:
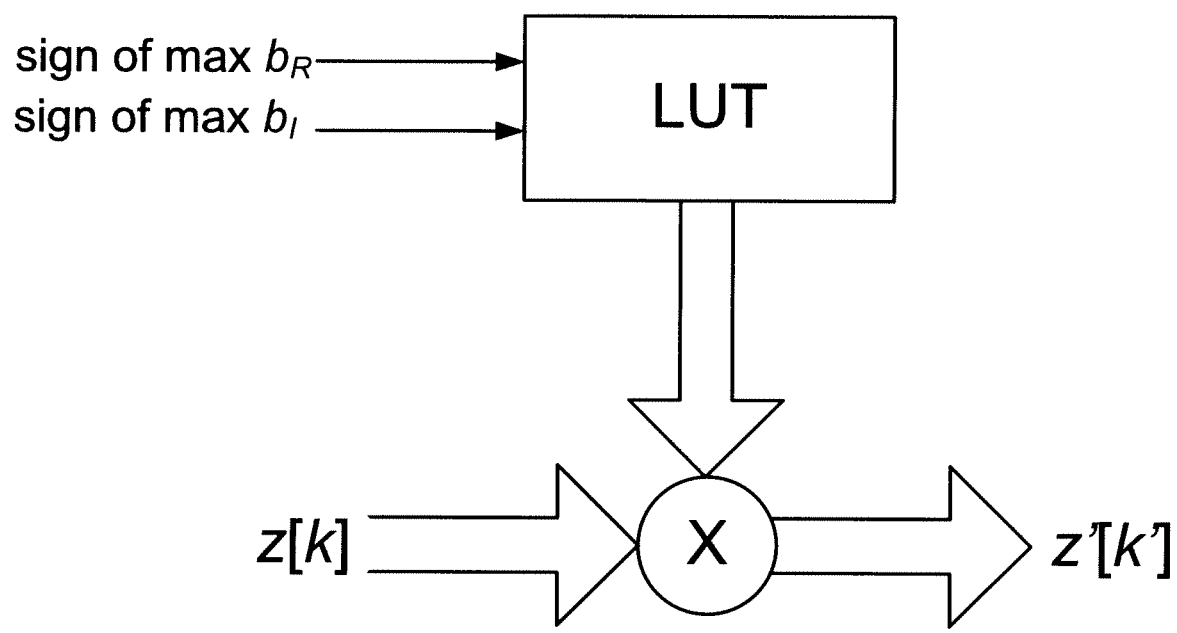
FIG. 23 is a block schematic representation of a phase offset corrector that derives a phase-corrected signal by indexing a lookup table with the signs of the maximum real and imaginary values of a correlation according to certain aspects of the invention.

This is summarized in the Table 5, above. Thus, the respective signs of the maximum magnitude $b_R$ and $b_I$ in combination indicate to which quadrant of the complex plane the final phase offset has converged. This allows for an additional phase correction to be applied to the signal as shown in FIG. 12. The signs of the maximum $b_R$ and $b_I$ are sent from the correlation based frame-sync module to the phase offset corrector. The operation of one phase offset corrector module is shown in FIG. 22, for which Table 6 shows an example of look-up table operation.

TABLE 6

| sign of max $b_R$ | sign of max $b_I$ | $\bar{\phi}$ |
|---|---|---|
| + | + | 0 |
| − | + | $+\pi/2$ |
| − | − | $+\pi$ |
| + | − | $-\pi/2$ |

Figure 24:
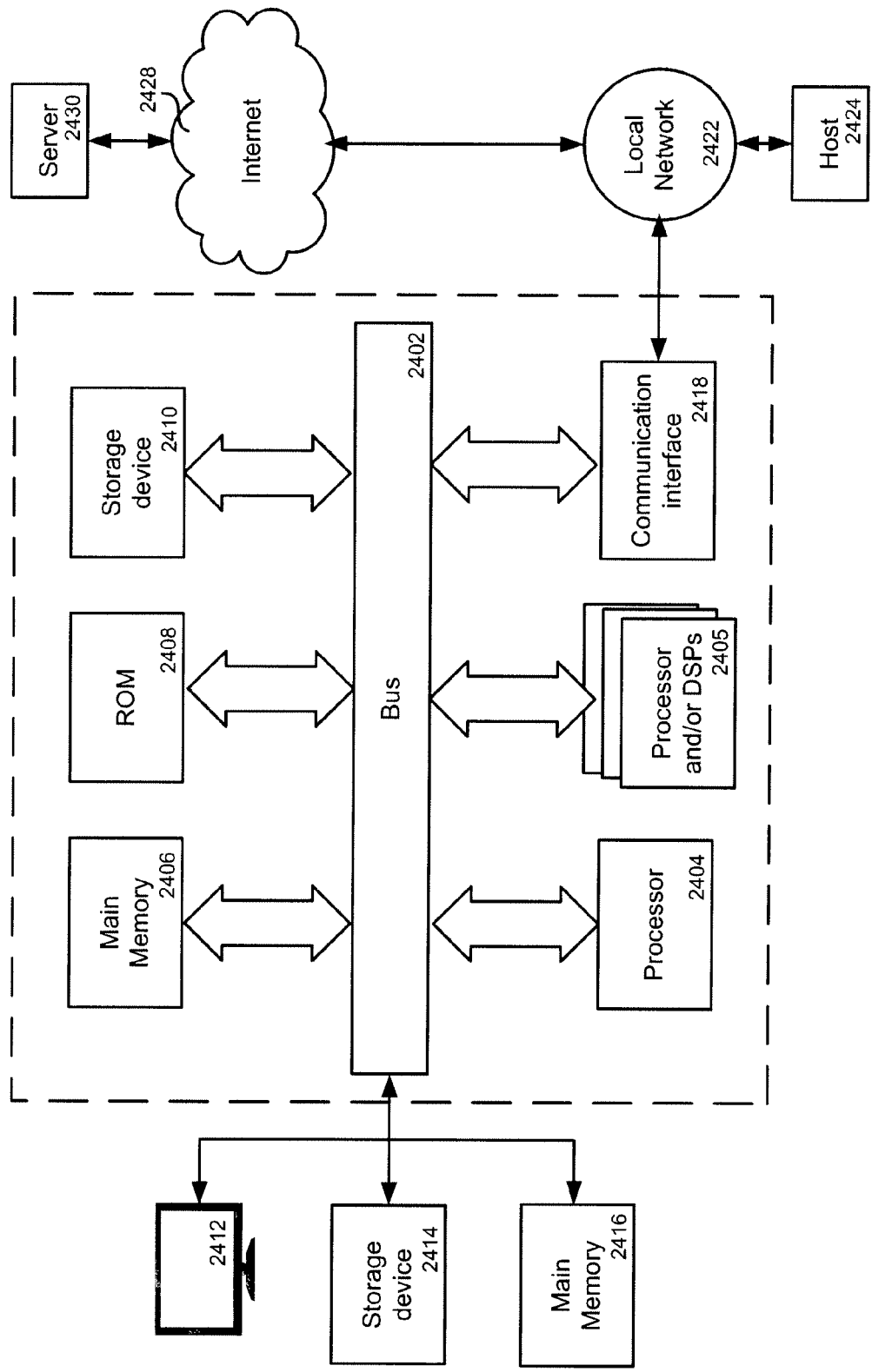
FIG. 24 is a simplified block schematic illustrating a processing system employed in certain embodiments of the invention.

Given that $z[k]=z_R[k]+jz_I[k]$, this operation can be executed simply as:

for the case of $\phi=+0$: $z'[k]=-z_R[k]-jz_I[k]$ for the case of $\phi=+\pi/2$: $z'[k]=-z_I[k]+jz_R[k]$ for the case of $\phi=-\pi/2$: $z'[k]=+z_I[k]-jz_R[k]$ System Description Turning now to FIG. 24, certain embodiments of the invention employ a processing system 240 that includes at least one processor configured to perform certain of the processes, methods and/or steps described above. System 240 may employ a commercially available operating system such as Microsoft Windows®, UNIX or a variant thereof, Linux, a real time operating system and/or a proprietary operating system. The architecture of the system 240 may be adapted, configured and/or designed for embedding in one or more of communications system. In one example, system 240 comprises a bus 2402 and/or other mechanisms for communicating between processors, whether those processors are integral to the system 240 (e.g. 2404, 2405) or located in different, perhaps physically separated systems 240.

System 240 also typically comprises memory 2406 that may include one or more of random access memory ("RAM"), static memory, cache, flash memory and any other suitable type of storage device that can be coupled to bus 2402. Memory 2406 can be used for storing instructions and data that can cause one or more of processors 2404 and 2405 to perform a desired process. Main memory 2406 may be used for storing transient and/or temporary data such as variables and intermediate information generated and/or used during execution of the instructions by processor 2404 or 2405. System 240 also typically comprises non-volatile storage such as read only memory ("ROM") 2408, flash memory, memory cards or the like; non-volatile storage may be connected to the bus 2402, but may equally be connected using a high-speed universal serial bus (USB), Firewire or other such bus that is coupled to bus 2402. Non-volatile storage can be used for storing configuration, and other information, including instructions executed by processors 2404 and/or 2405. Non-volatile storage may also include mass storage device 2410, such as a magnetic disk, optical disk, flash disk that may be directly or indirectly coupled to bus 2402 and used for storing instructions to be executed by processors 2404 and/or 2405, as well as other information.

Processors 2404, 2405 can include any commercially available microprocessor, digital signal processor ("DSP") or a combination 2405 of processors and DSPs. For example, a processing device may comprises processing core such as an ARM 2404 or similar RISC processor coupled with one or more DSPs 2405 together with other logic and components. The proprietary device may be configurable and may be embodied in an application specific integrated circuit.

The term "computer-readable medium" is used to define any medium that can store and provide instructions and other data to processor 2404 and/or 2405, particularly where the instructions are to be executed by processor 2404 and/or 2405 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 2404 and 2405 or remotely, typically by use of network connection. Non-volatile storage may be removable from computing system 2404, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of system 240. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 2404 and/or 2405. For example, the instructions may initially be retrieved from a magnetic disk of a remote computer and transmitted over a network or modem to system 240. The instructions may optionally be stored in a different storage or a different part of storage prior to or during execution.

System 240 may include a communication interface 2418 that provides two-way data communication over a network 2420 that can include a local network 2422, a wide area network or some combination of the two. For example, an integrated services digital network (ISDN) may used in combination with a local area network (LAN). In another example, a LAN may include a wireless link. Network link 2420 typically provides data communication through one or more networks to other data devices. For example, network link 2420 may provide a connection through local network 2422 to a host computer 2424 or to a wide are network such as the Internet 2428. Local network 2422 and Internet 2428 may both use electrical, electromagnetic or optical signals that carry digital data streams.

System 240 can use one or more networks to send messages and data, including program code and other information. In the Internet example, a server 2430 might transmit a requested code for an application program through Internet 2428 and may receive in response a downloaded application that provides for the anatomical delineation described in the examples above. The received code may be executed by processor 2404 and/or 2405.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems used in digital signal processing and communication systems. Some of these embodiments comprise a phase offset corrector that receives an equalized signal representative of a quadrature amplitude modulated signal and that derives a phase-corrected signal from the equalized signal. Some of these embodiments comprise a two-level slicer that slices the equalized signal to obtain real and imaginary sequences. Some of these embodiments comprise a frame synchronizer that performs a correlation of the real and imaginary sequences with corresponding parts of a stored frame-sync pseudo-random sequence. Some of these embodiments comprise a phase correction signal provided by the frame synchronizer to the phase offset corrector. In some of these embodiments, the phase correction signal is based on the maximum real and imaginary values of the correlation. In some of these embodiments, the frame synchronizer performs continuous cross-correlation on incoming sliced quadrature amplitude modulated symbols. In some of these embodiments, the continuous cross-correlation is performed separately for the real and imaginary sequences with a stored copy of a binary frame-sync pseudo-random noise sequence.

In some of these embodiments, the quadrature amplitude modulated signal is modulated using punctured trellis codes. In some of these embodiments, the quadrature amplitude modulated signal is modulated using quadrature phase shift keying modulation. In some of these embodiments, the quadrature amplitude modulated (QAM) signal is modulated using 16-QAM. In some of these embodiments, the quadrature amplitude modulated (QAM) signal is modulated using 64-QAM. In some of these embodiments, frame sync symbols of the quadrature amplitude modulated signal have the same sign and the signs of the maximum real and imaginary values of the correlation are indicative of phase rotation in the equalized signal. In some of these embodiments, the phase correction signal provided by the frame synchronizer comprises the signs of the maximum real and imaginary values of the correlation. In some of these embodiments, the phase offset corrector derives the phase-corrected signal by indexing a lookup table with the signs of the maximum real and imaginary values of the correlation to determine a phase correction value.

Certain embodiments of the invention provide systems and methods for correcting carrier phase offset in a quadrature amplitude modulated signal in a receiver. In some of these embodiments, the method comprises equalizing the signal. In some of these embodiments, the method comprises slicing the equalized signal, thereby obtaining real and imaginary sequences from the equalized signal. In some of these embodiments, the method comprises identifying a frame synchronization sequence in the real and imaginary sequences. In some of these embodiments, identifying the frame synchronization sequence includes correlating a stored pseudo-random sequence with the real and imaginary sequences and determining a start of a frame from maximum correlation values associated with the real and imaginary sequences. In some of these embodiments, the method comprises correcting a phase error in the equalized signal based on the maximum correlation values.

In some of these embodiments, the correlating step includes performing continuous cross-correlation on a series of sliced quadrature amplitude modulated symbols with a stored copy of a binary frame-sync pseudo-random noise sequence. In some of these embodiments, the correlating step includes performing continuous cross-correlation on a stored copy of the frame synchronization sequence separately with the real and imaginary sequences. In some of these embodiments, frame sync symbols of the frame synchronization sequence have the same sign. In some of these embodiments, correcting a phase error includes determining phase rotation in the equalized signal based on the signs of the maximum correlation values. In some of these embodiments, correcting a phase error in the equalized signal includes indexing a lookup table with the signs of the real and imaginary maximum correlation values.

Certain embodiments of the invention provide systems and methods for correcting carrier phase offset in a quadrature amplitude modulated signal. In some of these embodiments, the method is implemented in a system comprising one or more processors configured to execute instructions. In some of these embodiments, the method comprises executing, on the one or more processors, instructions configured to equalize the signal. In some of these embodiments, the method comprises executing, on the one or more processors, instructions configured to slice the equalized signal, thereby obtaining real and imaginary sequences from the equalized signal. In some of these embodiments, the method comprises executing, on the one or more processors, instructions configured to identify a frame synchronization sequence in the real and imaginary sequences. In some of these embodiments, wherein identifying the frame synchronization sequence includes performing continuous cross-correlation on a stored copy of the frame synchronization sequence separately with the real and imaginary sequences and determining a start of a frame from maximum correlation values associated with the real and imaginary sequences. In some of these embodiments, the method comprises executing, on the one or more processors, instructions configured to correct a phase error in the equalized signal based on the maximum correlation values. In some of these embodiments, frame sync symbols of the frame synchronization sequence have the same sign. In some of these embodiments, correcting a phase error includes determining phase rotation in the equalized signal based on the signs of the maximum correlation values.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A system embodied in a modem, the system comprising:
a phase offset corrector that receives an equalized signal representative of a quadrature amplitude modulated signal and derives a phase-corrected signal from the equalized signal;
a two-level slicer that slices the equalized signal to obtain real and imaginary sequences;
a frame synchronizer that performs a correlation of the real and imaginary sequences with corresponding parts of a stored frame-sync pseudo-random sequence; and
a phase correction signal provided by the frame synchronizer to the phase offset corrector, wherein the phase correction signal is based on the maximum real and imaginary values of the correlation, and wherein the real and imaginary parts of the frame sync symbols of the quadrature amplitude modulated signal have the same sign, and the signs of the maximum real and imaginary values of the correlation are indicative of phase rotation in the equalized signal.

2. The system of claim 1, wherein the frame synchronizer performs continuous cross-correlation on incoming sliced quadrature amplitude modulated symbols.

3. The system of claim 2, wherein the continuous cross-correlation is performed separately for the real and imaginary sequences with a stored copy of a binary frame-sync pseudo-random noise sequence.

4. The system of claim 1, wherein the quadrature amplitude modulated signal is modulated using punctured trellis codes.

5. The system of claim 1, wherein the quadrature amplitude modulated signal is modulated using quadrature phase shift keying modulation.

6. The system of claim 1, wherein the quadrature amplitude modulated (QAM) signal is modulated using 16-QAM.

7. The system of claim 1, wherein the quadrature amplitude modulated (QAM) signal is modulated using 64-QAM.

8. The system of claim 1, wherein the phase correction signal provided by the frame synchronizer comprises the signs of the maximum real and imaginary values of the correlation.

9. The system of claim 1, wherein the phase offset corrector derives the phase-corrected signal by indexing a lookup table with the signs of the maximum real and imaginary values of the correlation to determine a phase correction value.

10. A method for correcting carrier phase offset in a quadrature amplitude modulated signal in a receiver, the method comprising:
equalizing the signal;
slicing the equalized signal, thereby obtaining real and imaginary sequences from the equalized signal;
identifying a frame synchronization sequence in the real and imaginary sequences, wherein identifying the frame synchronization sequence includes correlating a stored pseudo-random sequence with the real and imaginary sequences, and determining a start of a frame from maximum correlation values associated with the real and imaginary sequences; and
correcting a phase error in the equalized signal based on the maximum correlation values,
wherein the correlating step includes performing continuous cross-correlation on a stored copy of the frame synchronization sequence separately with the real and imaginary sequences, and
wherein real and imaginary parts of frame sync symbols in the frame synchronization sequence have the same sign.

11. The method of claim 10, wherein the correlating step includes performing continuous cross-correlation on a series of sliced quadrature amplitude modulated symbols with a stored copy of a binary frame-sync pseudo-random noise sequence.

12. The method of claim 10, wherein correcting a phase error includes determining phase rotation in the equalized signal based on the signs of the maximum correlation values.

13. The system of claim 12, wherein correcting a phase error in the equalized signal includes indexing a lookup table with the signs of the real and imaginary maximum correlation values.

14. A method for correcting carrier phase offset in a quadrature amplitude modulated signal, wherein the method is implemented in a system comprising one or more processors configured to execute instructions, the method comprising:
executing, on the one or more processors, instructions configured to equalize the signal;
executing, on the one or more processors, instructions configured to slice the equalized signal, thereby obtaining real and imaginary sequences from the equalized signal;
executing, on the one or more processors, instructions configured to identify a frame synchronization sequence in the real and imaginary sequences, wherein identifying the frame synchronization sequence includes performing continuous cross-correlation on a stored copy of the frame synchronization sequence separately with the real and imaginary sequences, and determining a start of a frame from maximum correlation values associated with the real and imaginary sequences; and executing, on the one or more processors, instructions configured to correct a phase error in the equalized signal based on the maximum correlation values, wherein the real and imaginary parts of the frame sync symbols of the frame synchronization sequence have the same sign, and wherein correcting a phase error includes determining phase rotation in the equalized signal based on the signs of the maximum correlation values.

15. A non-transitory computer-readable medium comprising code for:

equalizing the signal;

slicing the equalized signal, thereby obtaining real and imaginary sequences from the equalized signal;

identifying a frame synchronization sequence in the real and imaginary sequences, wherein identifying the frame synchronization sequence includes performing continuous cross-correlation on a stored copy of the frame synchronization sequence separately with the real and imaginary sequences, and determining a start of a frame from maximum correlation values associated with the real and imaginary sequences; and correcting a phase error in the equalized signal based on the maximum correlation values, wherein the real and imaginary parts of the frame sync symbols of the frame synchronization sequence have the same sign, and wherein correcting a phase error includes determining phase rotation in the equalized signal based on the signs of the maximum correlation values.

* * * * *